(12) United States Patent
Ohhashi et al.

(10) Patent No.: US 9,138,819 B2
(45) Date of Patent: Sep. 22, 2015

(54) PLASTIC DEFORMATION TAPPING TOOL WITH INSIDE DIAMETER FINISHING EDGES

(75) Inventors: Seiji Ohhashi, Toyokawa (JP); Katsuya Matsumoto, Toyokawa (JP); Yousuke Suzuki, Toyokawa (JP)

(73) Assignee: OSG CORPORATION, Toyokawa-shi (JP)

( * ) Notice: Subject to any disclaimer, the term of this patent is extended or adjusted under 35 U.S.C. 154(b) by 517 days.

(21) Appl. No.: 13/521,887

(22) PCT Filed: Jan. 13, 2010

(86) PCT No.: PCT/JP2010/050292
§ 371 (c)(1),
(2), (4) Date: Jul. 12, 2012

(87) PCT Pub. No.: WO2011/086675
PCT Pub. Date: Jul. 21, 2011

(65) Prior Publication Data
US 2012/0301236 A1   Nov. 29, 2012

(51) Int. Cl.
*B23G 7/02* (2006.01)
*B23G 5/20* (2006.01)

(52) U.S. Cl.
CPC .. *B23G 7/02* (2013.01); *B23G 5/20* (2013.01); *Y10T 408/34* (2015.01)

(58) Field of Classification Search
CPC .............. B23G 5/06; B23G 5/20; B23G 7/02
USPC .......... 408/215, 219, 220, 222; 470/198, 199, 470/204
See application file for complete search history.

(56) References Cited

U.S. PATENT DOCUMENTS 3,328,814 A * 7/1967 Hudson .......................... 408/220
6,217,267 B1 * 4/2001 Sugano et al. ................. 408/222

FOREIGN PATENT DOCUMENTS

| JP | 62004515 A * | 1/1987 |
| JP | A-9-216126 | 8/1997 |
| JP | A-11-19825 | 1/1999 |

OTHER PUBLICATIONS

Apr. 20, 2010 International Search Report issued in International Patent Application No. PCT/JP2010/050292.

* cited by examiner

*Primary Examiner* — Daniel Howell
*Assistant Examiner* — Alan Snyder
(74) *Attorney, Agent, or Firm* — Oliff PLC

(57) ABSTRACT

Flutes defining inside diameter finishing edges are formed in middle portions of relief parts arranged in three linear arrays which are located between a plurality of linear arrays of protruding parts in a chamfered end section, about an axis 0, and the inside diameter finishing edges are formed along one of opposite open-end edges of each flute which is located on an upstream side of the flute as seen in a tap rotating direction A, and are offset by a predetermined angle θ in the tap rotating direction A with respect to the protruding parts in the chamfered end section. Accordingly, all of the plurality of linear arrays of protruding parts in the chamfered end section can be used to form the internal thread by plastic deformation of an inner circumferential surface of a hole to be tapped.

3 Claims, 5 Drawing Sheets

FIG.4(a)
TAPPING CONDITION

| NOMINAL TAP CONFIGURATION | M6 × 1 |
|---|---|
| WORKPIECE MATERIAL | ADC12 |
| THREADING LENGTH | 12mm (BLIND HOLE) |
| CUTTING FLUID | WATER SOLUBLE FLUID (EXTERNALLY SUPPLIED) |
| CUTTING SPEED | 15m/min |

FIG.4(b)
TEXT RESULT

| SPECIMENS | | NUMBER OF TAPPED HOLES | AVERAGE NUMBER | DURABILITY LIMIT |
|---|---|---|---|---|
| PRESENT INVENTION | No1 | 10033 | 10116 (158%) | GP-OUT |
| | No2 | 9890 | | GP-OUT |
| | No3 | 10126 | | GP-OUT |
| PRIOR ART | No1 | 6815 | 6397 (100%) | GP-OUT |
| | No2 | 7020 | | GP-OUT |
| | No3 | 5355 | | PP-NG |

Prior Art

PLASTIC DEFORMATION TAPPING TOOL WITH INSIDE DIAMETER FINISHING EDGES

TECHNICAL FIELD

The present invention relates to a plastic deformation tapping tool (thread forming tap) with inside diameter finishing edges, and more particularly to a plastic deformation tapping tool with inside diameter finishing edges, which has a small axial dimension of a chamfered end section and a high degree of durability.

BACKGROUND ART

There is known a plastic deformation tapping tool with inside diameter finishing edges, (a) comprising an external thread portion provided with a complete thread section, and a chamfered end section which is formed contiguously to the complete thread section and a diameter of which decreases in its axial direction toward its end face, and wherein protruding parts and relief parts are alternately formed in at least a length portion of the tapping tool from the chamfered end section to a first turn of thread of above-described complete thread section, so that the protruding parts are successively forced into an inner circumferential surface of a hole to be tapped, to form an internal thread in the inner circumferential surface by plastic deformation, (b) and wherein a flute is formed axially so as to divide a crest of the above-described external thread portion, in parallel with an axis O through the above-described chamfered end section and the above-described complete thread section, and the complete thread section is formed with the inside diameter finishing edges partially defined by an inner wall surface of the flute functioning as a rake surface, so that the inside diameter finishing edges remove by cutting an apex of a crest of the above-described internal thread, which crest is formed by the above-indicated plastic deformation (as disclosed in Patent Document 1).

A tapping tool 100 shown in FIGS. 5 is an example of such a conventional plastic deformation tapping tool with inside diameter finishing edges. FIG. 5(a) is a front elevational view taken along arrows VA in FIGS. 5(b) and 5(c), which are perpendicular to axis O, and FIGS. 5(b) and 5(c) are enlarged cross sectional views taken along respective lines VB-VB and VC-VC in FIG. 5(a). This plastic deformation tapping tool 100 is integrally provided with: a shank 12 at which the tapping tool 100 is attached to a main spindle through a chuck not shown; a neck portion 14 having a smaller diameter than the shank 12; and an external thread portion 16 having an external thread for forming an internal thread by plastic deformation (by rolling operation), such that the shank 12, neck portion 14 and external thread portion 16 are arranged in the order of description, coaxially with the axis O.

The above-described external thread portion 16 has a crest 18 which has a cross sectional shape corresponding to a shape of a root of the internal thread to be formed, and which is formed so as to extend along a helix having a lead angle of the internal thread. The external thread portion 16 is provided with a complete thread section 26 having a diameter substantially constant in its axial direction, and a chamfered end section 24 a diameter of which decreases in its axial direction toward its end face. Over entire lengths of the chamfered end section 24 and complete thread section 26 of the external thread portion 16, the crest 18 has six radially outwardly extending protruding parts 20a-20f, and relief parts 22 formed contiguously to and having smaller diameters than the respective protruding parts 20a-20f, such that the protruding parts 20a-20f and the relief parts 22 are arranged alternately in a direction of formation of an external thread of the external thread portion 16, with an angular spacing pitch of 60° about the axis O. Thus, the external thread portion 16 takes the form of a substantially regular hexagonal prism. Namely, the protruding parts 20a-20f which define respective six apexes of a regular or equilateral hexagon constitute respective six linear arrays each of which consists of a multiplicity protruding parts 20 successively arranged in a direction parallel to the axis O and which are equally angularly spaced apart from each other about the axis O. It is noted that FIGS. 5(b) and 5(c) are both cross sectional views taken along the helix of the root of the crest 18.

The above-described external thread portion 16 is formed by a grinding operation with a thread grinding member 30 (shown in FIG. 2) which has an outer circumferential grinding surface with a cross sectional shape corresponding to that of the crest 18. The diameters of the above-described protruding parts 20a-20f, relief parts 22 and chamfered end section 24 are adjusted to respective nominal values by moving the thread grinding member 30 toward and away from a workpiece used to form the tapping tool. That is, the crest 18 has a constant cross sectional shape over the entire lengths of the chamfered end section 24 and complete thread section 26, but the protruding parts 20a-20f, relief parts 22 and chamfered end section 24 have respective different outside diameters, respective different effective diameters and respective different root diameters. Broken lines in FIGS. 5(b) and 5(c) indicate the crest 18 formed by the above-indicated grinding operation, and the above-indicated regular hexagonal prism is the form of the workpiece immediately after the crest 18 is formed by the grinding operation.

Flutes 28 are formed adjacent to the apex ridges of the respective three arrays of the protruding parts 20a, 20c and 20e which are spaced apart from each other about the axis O by the other protruding parts of the six arrays of the protruding parts 20a-20f. The flutes 28 are formed on the downstream side of the three arrays of the protruding parts 20a, 20c, 20e as seen in a tap rotating direction (rotating direction of the tapping tool) A, and have a predetermined width dimension, to allow a lubricating fluid to be supplied to the end face of the tapping tool during its tapping operation. In the complete thread section 26, the three arrays of the protruding parts 20a, 20c, 20e function as large-diameter protruding parts which have a larger diameter than the other three arrays of the protruding parts 20b, 20d, 20f, and which are provided for forming inner circumference finishing edges 34. That is, the portion of each large-diameter protruding part which remains after the flute 28 is formed and which exists on the side remote from the flute 28 as seen circumferentially about the axis O is removed by the grinding operation, down to the root of the crest 18, so as to form a substantially flat relief surface 32, so that the inner circumference finishing edge 34 is formed along one of opposite open-end edges of the flute 28, which one open-end edge is on the upstream side of the flute 28 as seen in the tap rotating direction A. The inner circumference finishing edges 34 have the constant diameter not only in the complete thread section 26 but also in the chamfered end section 24. In the chamfered end section 24 in which the protruding parts 20a-20f have diameters which increase in steps, the portions of the three arrays of the protruding parts 20a, 20c, 20e which exist on the downstream side of their apex ridges as seen in the tap rotating direction A are removed by formation of the flutes 28, so that these protruding parts 20a, 20c, 20e are not forced into the inner circumferential surface of the hole to be tapped, whereby these protruding parts 20a, 20c, 20e are not able to cause plastic deformation of the inner circumferential surface. For this reason, the relief surfaces 32 are formed to provide the inside diameter finishing edges 34 also in the chamfered end section 24, to prevent the otherwise remaining crest 18 other than the flute region in the protruding parts 20a, 20c, 20e from interfering the hole. Patent Document 1 discloses hole clean-up edges having a larger diameter than the inside diameter finishing edges 34.

PRIOR ART DOCUMENT

Patent Document

Patent Document 1: JP-11-19825 A

SUMMARY OF THE INVENTION

Object Achieved By The Invention

However, such a conventional plastic deformation tapping tool with inside diameter finishing edges as described above has a drawback that selected ones of the plurality of arrays of protruding parts (three arrays of the protruding parts 20a, 20c and 20e in the example of FIGS. 5) in the chamfered end section cannot contribute to the formation of an internal thread by plastic deformation, in the presence of the flutes, so that the internal thread must be substantially formed by plastic deformation by only the remaining arrays of the protruding parts (three arrays of the protruding parts 20b, 20d and 20f in the example of FIGS. 5). Accordingly, a load (an amount of deformation) per each of the protruding parts increases, so that the protruding parts have a low degree of durability. Although the durability can be improved by reducing the taper angle of the chamfered end section and increasing its axial length in order to increase the number of the protruding parts contributing the plastic deformation to form the internal thread, an increase of the axial length of the chamfered end section may cause tapping restrictions, such as inability to form an internal thread to the bottom of a blind hole.

The present invention was made in view of the background art described above. It is therefore an object of the present invention to provide a plastic deformation tapping tool with inside diameter finishing edges, which has a small axial dimension of a chamfered end section and a high degree of durability. Means For Achieving The Object The object indicated above is achieved according to a first aspect of this invention, which provides a plastic deformation tapping tool with inside diameter finishing edges, (a) comprising an external thread portion provided with a complete thread section, and a chamfered end section which is formed contiguously to the complete thread section and a diameter of which decreases in its axial direction toward its end face, and wherein protruding parts and relief parts are alternately formed in at least a length portion of the tapping tool from the chamfered end section to a first turn of thread of the above-described complete thread, so that the protruding parts are successively forced into an inner circumferential surface of a hole to be tapped, to form an internal thread in the inner circumferential surface by plastic deformation, and wherein (b) at least one flute is formed axially so as to divide a crest of the above-described external thread portion, in parallel with an axis O through the above-described chamfered end section and the above-described complete thread section, and the complete thread section is formed with the inside diameter finishing edges defined by an inner wall surface of the flute functioning as a rake surface, so that the inside diameter finishing edges remove by cutting an apex of the crest of the above-described internal thread, which crest is formed by the above-described plastic deformation, the plastic deformation tapping tool being characterized in that (c) the above-described protruding parts in the above-described complete thread portion are provided with large-diameter protruding parts formed in parallel with the axis O to form the inside diameter finishing edges, and each of the above-described at least one flute is formed such that one of opposite open-end edges of the flute which is on an upstream side of the flute as seen in a rotating direction A of the tapping tool is coincident with an angular position of the large-diameter protruding parts about the axis O, and the above-described inside diameter finishing edges are formed by a grinding operation to remove portions of the large-diameter protruding parts which are remote from the flute about the axis O, (d) the above-described protruding parts in the above-described chamfered end section constitute a plurality of linear arrays each of which consists of a plurality of protruding parts successively arranged in a direction parallel to the above-described axis O and which are angularly spaced apart from each other about the above-described axis O, (e) the above-described large-diameter protruding parts are offset in the rotating direction A of the tapping tool about the above-described axis O with respect to the above-described protruding parts in the above-described chamfered end section, and each of the above-described at least one flute is formed so as to correspond to the above-described large-diameter protruding parts, in the above-described relief parts which are located between the above-described plurality of linear arrays of protruding parts in the above-described chamfered end section, about the above-described axis O, and (f) the above-described inside diameter finishing edges are formed along one of opposite open-end edges of each of the above-described at least one flute, and are offset by a predetermined angle θ in the rotating direction A with respect to the above-described protruding parts in the above-described chamfered end section.

According to a second aspect of the invention, the plastic deformation tapping tool with the inside diameter finishing edge of the first aspect of the invention is configured such that an angular position of each of the above-described at least one flute about the above-described axis O and a cross sectional shape of the each flute are determined so as to prevent the above-described plurality of protruding parts in the above-descried chamfered end section from forming the above-described internal thread, in other words, so as to keep forced regions of the protruding parts remained completely, that are forced into the inner circumferential surface of the hole to be tapped to cause plastic deformation thereof.

According to a third aspect of the invention, the plastic deformation tapping tool with the inside diameter finishing edges of the first or second aspect of the invention is configured such that (a) the crest of the above-described external thread portion is formed by a grinding operation with a thread grinding member such that the crest has a constant cross sectional shape in entire lengths of the above-described chamfered end section and the above-described complete thread section, and diameters of the above-described protruding parts and the above-described relief parts are adjusted to respective values by moving the thread grinding member toward and away from a workpiece used to form the tapping tool, (b) the above-described at least one flute is formed such that the open-end edge of each of the at least one flute which is on the upstream side of the flute as seen in the rotating direction A is coincident with the angular positions of the above-described large-diameter protruding parts, and downstream side portions of the above-described large-diameter protruding parts as seen in the rotating direction A are removed in the presence of the at least one flute, (c) relief surfaces are formed by a grinding operation to remove portions of the above-described large-diameter protruding parts remote from the above-described each flute, down to a root of the above-described crest, to form the above-described inside diameter finishing edges.

Advantages Of The Invention

In the tapping tool with inside diameter finishing edges according to the present invention, the flute defining the inside diameter finishing edges is formed in the relief parts which are located between the plurality of linear arrays of protruding parts in the chamfered end section, about the axis O, and the inside diameter finishing edges are formed along one of the opposite open-end edges of the flute which is on an upstream side of the flute as seen in the rotating direction A of the tapping tool, and are offset by a predetermined angle θ in the rotating direction A with respect to the protruding parts in the chamfered end section. Accordingly, all of the plurality of linear arrays of protruding parts in the chamfered end section can be used to form the internal thread by plastic deformation of the inner circumferential surface of the hole to be tapped, so that the number of the protruding parts which contribute to the formation of the internal thread by the plastic deformation is increased, whereby a load (an amount of plastic deformation) per each of the protruding parts can be accordingly reduced, enabling the tapping tool to have an improved degree of durability against wearing, without having to increase an axial dimension of the chamfered end section.

According to the second aspect of the invention, the angular position of the flute about the axis O and the cross sectional shape of the flute are determined so as to prevent the plurality of protruding parts in the chamfered end section from forming the internal thread, so that the internal thread can be adequately formed by the plurality of protruding parts in the chamfered end section, and the durability of the tapping tool is improved, with the load being adequately distributed to the protruding parts.

According to the third aspect of the invention, the crest of the external thread portion is formed by a grinding operation with a thread grinding member such that the crest has a constant cross sectional shape in entire lengths of the chamfered end section and the complete thread section, and diameters of the crest are adjusted by moving the thread grinding member toward and away from a workpiece used to form the tapping tool, for forming the protruding parts, the relief parts and the large-diameter protruding parts for the inside diameter finishing edges. Further, the flute and relief surfaces are formed at predetermined angular positions about the axis O, so as to form the inside diameter finishing edges. Accordingly, the tapping tool with the inside diameter finishing edges which has a high degree of durability can be readily and economically manufactured, with a reduced axial length of the chamfered end section.

BRIEF DESCRIPTION OF THE DRAWINGS

FIGS. 4 are views indicating a result of a durability test of the tapping tool according to the invention and a tapping tool of the prior art.

MODE FOR CARRYING OUT THE INVENTION

Figure 1A:
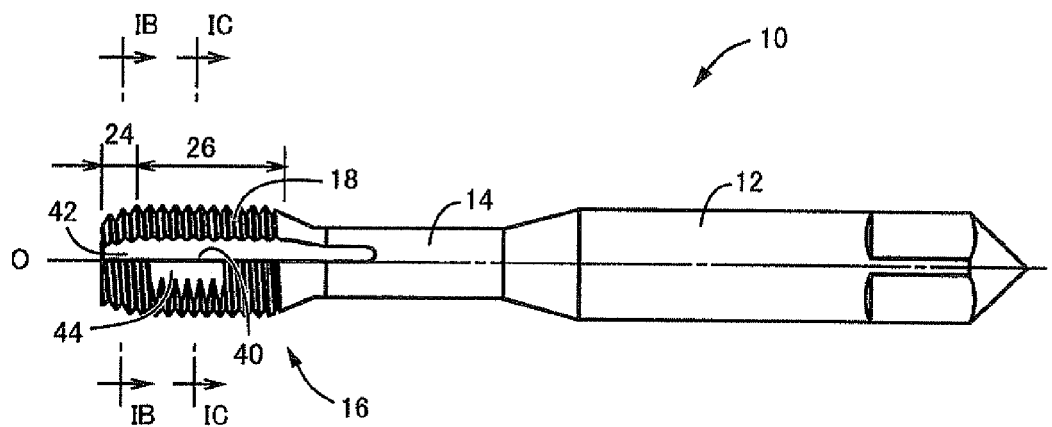
FIGS. 1 are views for explaining a plastic deformation tapping tool with inside diameter finishing edges according to one embodiment of this invention, FIG. 1(a) being a front elevational view taken along arrows IA in FIGS. 1(b) and 1(c), which are perpendicular to axis O, and FIG. 1(b) being an enlarged cross sectional view taken along line IB-IB in FIG. 1(a), while FIG. 1(c) being an enlarged cross sectional view taken along line IC-IC in FIG. 1(a)

While the protruding parts and the relief parts provided to form the internal thread may be formed at least in a length portion of the crest from the chamfered end section to the first turn of the complete thread (the leading end turn of thread of the complete thread section), these protruding and relief parts may be formed in the entire lengths of the chamfered end section and complete thread section. In the complete thread section, the crest may have a circular shape having a constant diameter, except for the first turn of the complete thread and the large-diameter protruding parts for the inside diameter finishing edges.

Where the protruding parts and the relief parts are provided through the chamfered end section and the complete thread section, only the large-diameter protruding parts provided in the complete thread section for forming the inside diameter finishing edges may be formed by a numerical control, for example, such that an angular phase of the large-diameter protruding parts is shifted by a suitable angle θ with respect to that of the protruding parts in the chamfered end section. However, the angular phase of all of the protruding parts of the complete thread section including the large-diameter protruding parts may be shifted by the suitable angle θ about the axis O with respect to that of the protruding parts of the chamfered end section. Namely, the protruding parts and the relief parts may be formed by using a cam, for example, at a constant angular spacing pitch, except for a length portion of the complete thread section in which the angular phase is different by the suitable angle θ from that of the chamfered end section.

The chamfered section has a plurality of linear arrays of protruding parts, for instance, two linear arrays which are provided at respective two diametrically symmetrical angular positions about the axis O. Preferably, however, the chamfered section has three or more linear arrays of protruding parts which are provided at a constant angular spacing pitch about the axis O. For example, the protruding parts are formed in the chamfered section such that the chamfered section has a substantially square or substantially regular hexagonal cross sectional shape. While only one flute may be formed in the linear array of relief parts between the plurality of linear arrays of protruding parts in the chamfered end section, two or more flutes may be formed in the respective linear arrays of relief parts. Where the chamfered end section has a four or more even number of linear arrays of protruding parts around the axis O, and the same number of linear arrays of relief parts, the flutes may be formed in the selected linear arrays of relief parts which are spaced apart from each other by the other linear arrays of relief parts. The inside diameter finishing edges are provided in the complete thread section, corresponding to the flute or flutes provided as described above.

The predetermined angle θ of the inside diameter finishing edges corresponds to an angular position of one of the opposite open-end edges of the flute, which one open-end edge is on the upstream side of the flute as seen in the tap rotating direction A. Preferably, the angle θ is determined so as to prevent the plurality of protruding parts in the chamfered end section from forming the internal thread, as in the second aspect of the invention. The angle θ is determined as needed, depending upon the number of the linear arrays of protruding parts about the axis O, and the nominal diameter of the tapping tool.

While the inside diameter finishing edges may be provided over substantially the entire length of the complete thread section, the inside diameter finishing edges may be provided in at least a portion of the length of the complete thread section. Where the complete thread section has a single thread, the inside diameter finishing edges may be provided along only one flute. Where a plurality of flutes are provided, the inside diameter finishing edges may be provided along all of the flutes, but may be provided along a selected one or selected ones of the flutes.

In the third aspect of this invention, the crest of the external thread portion is formed by a grinding operation with a thread grinding member, such that the crest has a constant cross sectional shape. The diameters of the protruding parts, relief parts and the large-diameter protruding parts for forming the inside diameter finishing edges are adjusted to respective nominal values by moving the thread grinding member toward and away from a workpiece used to form the tapping tool. However, any other method may be employed to form the external thread portion, according to other embodiments of the invention.

EMBODIMENT

An embodiment of this invention will be described in detail by reference to the drawings. It is to be understood that the present embodiment is an improvement of the conventional tapping tool of FIGS. 5 by applying this invention, and that the same reference signs as used in FIGS. 5 will be used to identify substantially the same elements, which will not be described in detail.

Figure 1B:
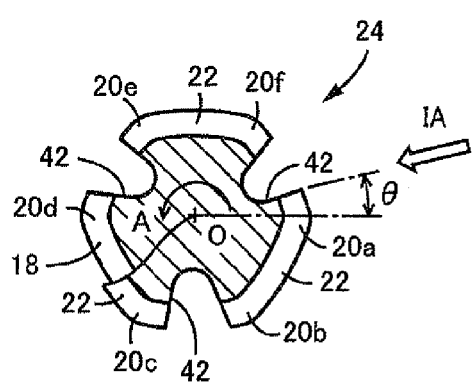
Figure 1C:
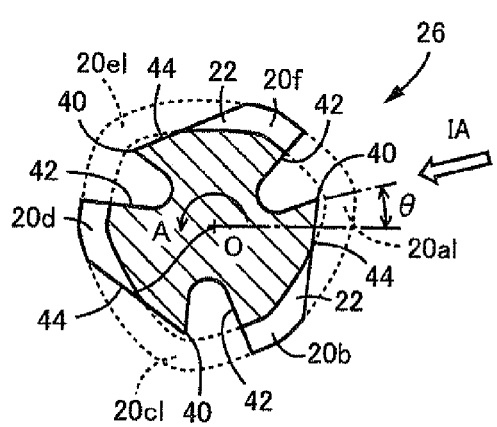
Figure 5A:
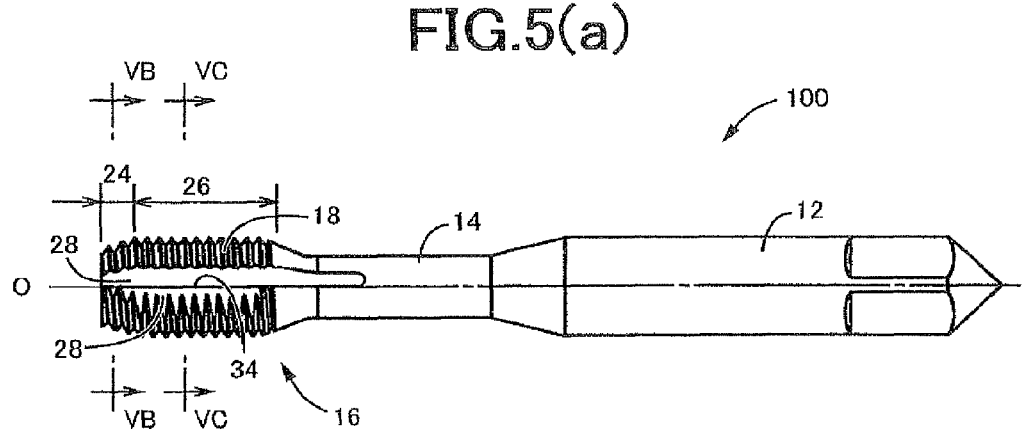
FIGS. 5 are a view corresponding to those of FIGS. 1, for explaining an example of a prior art plastic deformation tapping tool with inside diameter finishing edges.
Figure 5B:
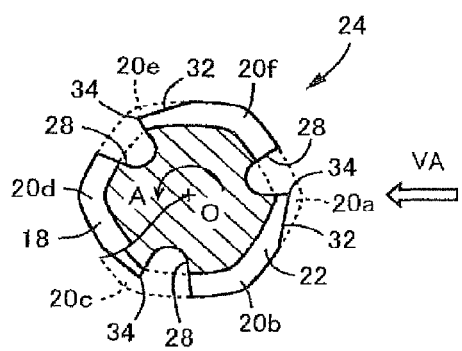

FIGS. 1 are views for explaining a plastic deformation tapping tool with inside diameter finishing edges according to one embodiment of this invention, that correspond to FIGS. 5, FIG. 1(a) being a front elevational view taken along arrows IA in FIGS. 1(b) and 1(c), which are perpendicular to axis O, and FIG. 1(b) being an enlarged cross sectional view taken along line IB-IB in FIG. 1(a), while FIG. 1(c) being an enlarged cross sectional view taken along line IC-IC in FIG. 1(a). This plastic deformation tapping tool (thread forming tap) 10 with the inside diameter finishing edges (hereinafter referred to as "plastic deformation tapping tool 10") has three flutes 42 which are formed in substantially middle portions of the respective relief parts 22, such that inside diameter finishing edges 40 are formed at respective angular positions that are offset by the predetermined angle θ about the axis O with respect to the respective three linear arrays of protruding parts 20a, 20c and 20e in the chamfered end section 24, in the tap rotating direction A. Further, relief surfaces 44 are for forming the inside diameter finishing edges 40 are formed in only an axially intermediate length portion of the complete thread section 26, which corresponds to about six turns of thread of the complete thread section 26. In this arrangement, all of the six linear arrays of protruding parts 20a-20f remain in the chamfered end section 24, even in the presence of the flutes 42, and can contribute to plastic deformation of the inner circumferential surface of a hole to be tapped, to form an internal thread in the inner circumferential surface. The above-indicated predetermined angle θ and the cross sectional shape of the flutes 42 are determined so as to prevent all of the protruding parts 20a-20f in the chamfered end section 24 from contributing to the plastic deformation to form the internal thread, namely, so as to keep forced regions of the protruding parts 20a-20f at the outermost portions thereof remained completely, that are forced into the inner circumferential surface of the hole to be tapped to cause plastic deformation thereof. The plastic deformation tapping tool 10 of the present embodiment has a nominal tap configuration of "M6×1" and the predetermined angle θ of about 14°.

Figure 2A:
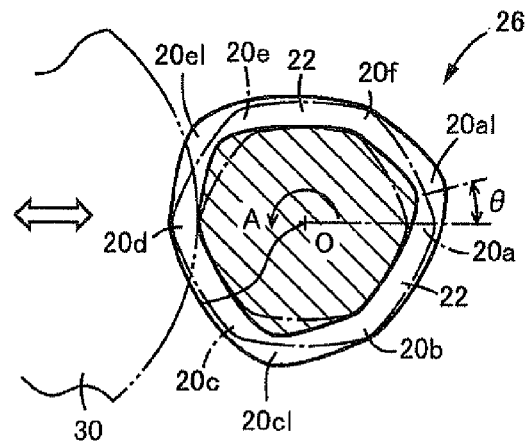
FIGS. 2 are cross sectional views for explaining a process of forming a complete thread portion of the plastic deformation tapping tool with the inside diameter finishing edges according to the embodiment of FIGS. 1, FIG. 2(a) showing crests having alternately formed protruding and relief portions, and FIG. 2(b) showing flutes formed axially so as to divide the crests, while FIG. 2(c) showing the inside diameter finishing edges defined by relief surfaces.

The flutes 42 are formed at the respective angular positions that are offset in the tap rotating direction A by the predetermined angle θ about the axis O with respect to the respective linear arrays of protruding parts 20a, 20c and 20e in the chamfered end section 24. Accordingly, large-diameter protruding parts 20al, 20cl and 20el, which are the protruding parts 20a, 20c, 20e in the complete thread section 26 in which the relief surfaces 44 are provided to form the inside diameter finishing edges 40, have a larger diameter than the other protruding parts 20a-20f, and have apexes that are offset in the tap rotating direction A by the predetermined angle θ about the axis O with respect to the apexes of the protruding parts 20a, 20c, 20e in the chamfered end section 24. The diameter of the crest 18 can be controlled as desired by moving the thread grinding member 30 toward and away from the workpiece used for the tapping tool, as indicated in FIG. 2(a). For example, the movement of the thread grinding member 30 is numerically controlled to form the large-diameter protruding parts 20al, 20cl, 20el such that the large-diameter protruding parts 20al, 20cl, 20el are angularly spaced apart from each other by different angles. Broken line in FIG. 1(c) indicates the thus formed large-diameter protruding parts 20al, 20cl, 20el.

Figure 5C:
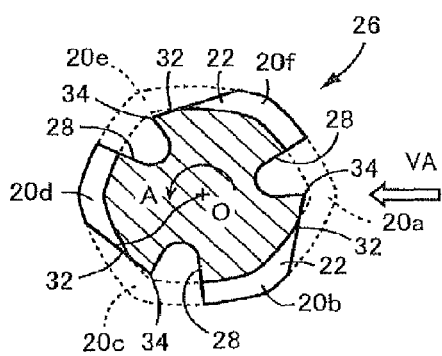

One-dot chain line in FIG. 2(a) shows a profile of the crest at first turn of thread of the complete thread section 26 on the leading end side. The protruding parts 20b, 20d and 20f which do not contribute to the formation of the inside diameter finishing edges 40 have no angular offset angle and the same diameter as those of the protruding parts in the section in which the relief surfaces 44 are provided, and only the large-diameter protruding parts 20al, 20cl, 20el which contribute to the formation of the inside diameter finishing edges 40 have the predetermined angle θ of offset in the tap rotating direction A from the protruding parts 20a, 20c, and 20e of the first turn of thread, respectively. Although the present embodiment is arranged to offset only the large-diameter protruding parts 20al, 20cl, 20el contributing to the formation of the inside diameter finishing edges 40, by the predetermined angle θ in the tap rotating direction A, the complete thread section 26 as shown in FIG. 5(c) may be entirely offset by the predetermined angle θ in the tape rotating direction A, for example.

Figure 2B:
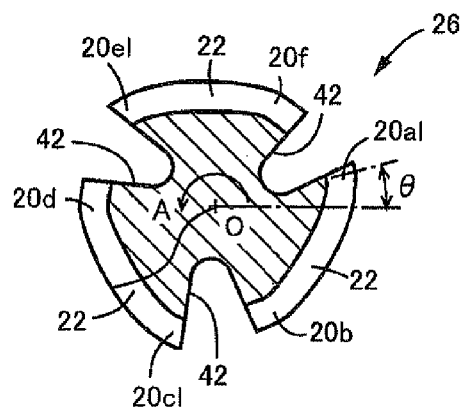
Figure 2C:
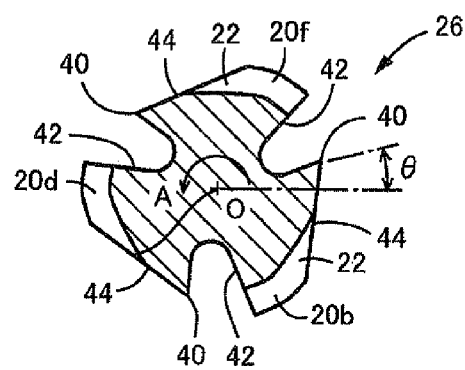
Figure 3A:
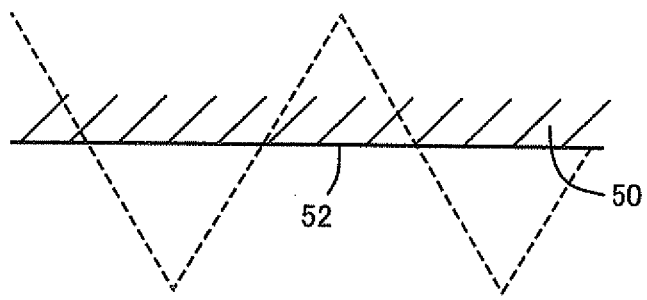
FIGS. 3 are schematic views for explaining a process of forming an internal thread by the plastic deformation tapping tool of FIGS. 1 with the inside diameter finishing edges, such that an apex of each crest of the internal thread is removed by a cutting operation by the tapping tool.
Figure 3B:
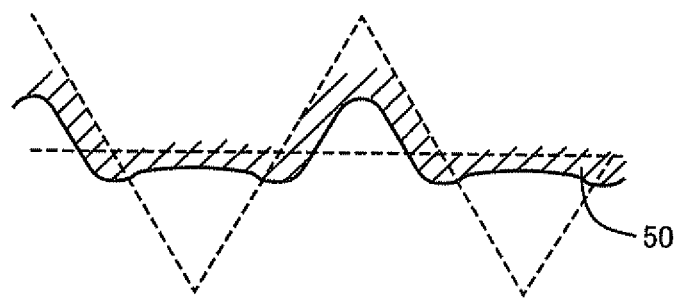
Figure 3C:
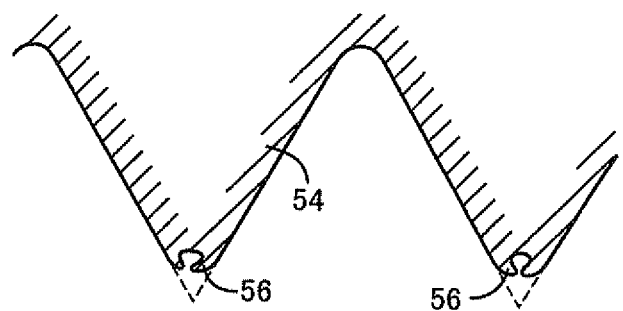
Figure 3D:
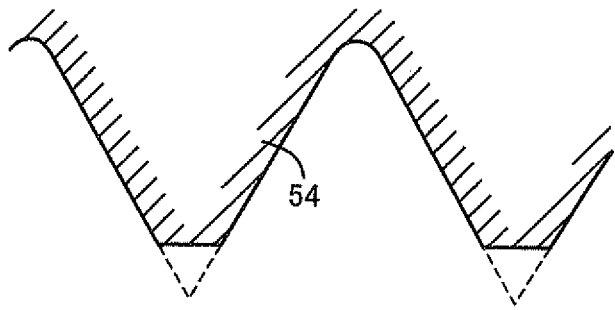

FIG. 2(b) shows the above-described flutes 42 formed by a grinding operation with the thread grinding member (grinding wheel). The flutes 42 are formed such that one of the opposite open-end edges, in the open ends, of each flute 42 which is on the downstream side as seen in the tap rotating direction A is coincident with the apex of the corresponding large-diameter protruding part 20al, 20cl, 20el, namely, is angularly offset by the predetermined angle θ in the tap rotating direction A about the axis O with respect to the protruding parts 20a, 20c, 20e in the chamfered end section 24. Accordingly, a half of each large-diameter protruding part 20al, 20cl, 20el on the downstream side as seen in the tap rotating direction A is removed in the presence of the flute 42. FIG. 2(c) shows the above-described relief surfaces 44 formed as substantially flat surfaces by a grinding operation with the thread grinding member to remove the remaining halves of the large-diameter protruding parts 20al, 20cl, 20el located on the side remote from the flutes 42, down to the root of the crest 18, so that the inside diameter finishing edge 40 is formed along the open-end edge of the corresponding flute 42 which is on the upstream side as seen in the tap rotating direction A.

The plastic deformation tapping tool 10 constructed as described above is used to form an internal thread 54 in an inner circumferential surface 52 of a hole in a workpiece 50, by plastic deformation of the inner circumferential surface 52, as shown in FIGS. 3. Namely, the chamfered end section 24 of the plastic deformation tapping tool 10 is screwed into the inner circumferential surface 52 of the hole in the workpiece 50 shown in FIG. 3(a), so that the protruding parts 20a-20f provided in the chamfered end section 24 are successively forced into the inner circumferential surface 52, causing a progress of the plastic deformation of the inner circumferential surface 52 to form the internal thread 54, as shown in FIGS. 3(b) and 3(c). In this progress, apexes 56 of a crest of the internal thread 54 have irregular shapes due to radially inward flows of surplus stock of the workpiece 50, for instance, as shown in FIG. 3(c). Subsequently, however, the inside diameter finishing edges 40 provided in the complete thread section 26 are passed through the hole, to remove the surplus stock for finishing the internal thread 54 such that the apexes 56 of the crest have flat top faces having a predetermined inside diameter, as shown in FIG. 3(d). Thus, the internal thread 54 can be formed with high stability and a high degree of accuracy of its inside diameter, even in holes dimensional accuracy of which is difficult to control, like as-cast holes provided in a light alloy die-cast workpiece, for example.

In the tapping tool 10 according to the present embodiment of the invention, the flutes 42 defining the inside diameter finishing edges 40 are formed in the middle portions of the relief parts 22 arranged in the three linear arrays which are located between the plurality of linear arrays of protruding parts 20a-20f in the chamfered end section 24, about the axis O, and the inside diameter finishing edges 40 are formed along one of the opposite open-end edges of each of the flutes 42, which one open-end edge is located on the upstream side of the flutes 42 as seen in the tap rotating direction A, and are offset by the predetermined angle θ in the tap rotating direction A with respect to the protruding parts 20a, 20c, 20e in the chamfered end section 24. Accordingly, all of the plurality of linear arrays of protruding parts 20a-20f in the chamfered end section 24 can be used to form the internal thread 54 by plastic deformation of the inner circumferential surface 52 of the hole to be tapped, so that the number of the protruding parts 20a-20f which contribute to the formation of the internal thread 54 (by the plastic deformation) is increased. Described more specifically, the number of the protruding parts 20a-20f contributing to the formation of the internal thread 54 is doubled with respect to the number in the conventional tapping tool 100 of FIGS. 5. Accordingly, a load (an amount of plastic deformation) per each of the protruding parts 20a-20f can be reduced, enabling the tapping tool 10 to have an improved degree of durability against wearing, without having to increase the axial dimension of the chamfered end section 24.

The present embodiment is further configured such that the angular position of the flutes 42 about the axis O and the cross sectional shape of the flutes 42 are determined so as to prevent the plurality of protruding parts 20a-20f in the chamfered end section 24 from forming the internal thread 54, so that the internal thread 54 can be adequately formed by the plurality of protruding parts 20a-20f in the chamfered end section 24, and the durability of the tapping tool is improved, with the load being adequately distributed to the protruding parts 20a-20f.

The present embodiment is also configured such that the crest 18 of the external thread portion 16 is formed by the grinding operation with the thread grinding member 30 such that the crest 18 has a constant cross sectional shape in the entire lengths of the chamfered end section 24 and the complete thread section 26, and the diameters of the crest 18 are adjusted by moving the thread grinding member 30 toward and away from the workpiece used to form the tapping tool, for forming the protruding parts 20a-20f, the relief parts 22 and the large-diameter protruding parts 20al, 20cl and 20el for the inside diameter finishing edges. Further, the flutes 42 and relief surfaces 44 are formed at the predetermined angular positions about the axis O by the grinding operation, so as to form the inside diameter finishing edges 40. Accordingly, the tapping tool 10 which has a high degree of durability can be readily and economically manufactured, with a reduced axial length of the chamfered end section 24.

A durability test was conducted with respect to three specimens (present invention specimens) of the plastic deformation tapping tool 10 according to the illustrated embodiment, and three specimens (prior art specimens) of the plastic deformation tapping tool 100 shown in FIGS. 5. In the durability test, the specimens were subjected to a tapping operation under a tapping condition indicated in FIG. 4(a). A result of the durability test is indicated in FIG. 4(b). "ADC12" of the workpiece material indicated in FIG. 4(a) represents an aluminum alloy die-casting defined in JIS (Japanese Industrial Standards). The durability limit was determined depending upon whether a "go" type thread plug gauge (GP) and an inside diameter plug gauge (PP) can pass through the tapped holes. That is, the tapping tool was determined to have reached its durability limit if the "go" type thread plug gauge (GP) was not able to be passed through the tapped hole, due to an excessive decrease of the effective diameter of the internal thread caused by excessive wearing of the protruding parts 20a-20f. This durability limit is indicated as "GP-OUT". The tapping tool was also determined to have reached its durability limit if the "no-go" end of the inside diameter plug gauge (PP) was able to be passed through the tapped hole, due to an excessive increase of the inside diameter of the internal thread caused by insufficient plastic deformation due to excessive wearing of the protruding parts 20a-20f. This durability limit is indicated as "PP-NG".

The test result indicated in FIG. 4(b) reveals that the average number of the holes that could be tapped by the present invention specimens is more than 50% larger than that of the holes that could be tapped by the prior art specimens, showing an improved degree of durability of the present invention specimens. Further, a visual inspection of the chamfered end sections 24 of the plastic deformation tapping tools 10, 100 after the test reveals a higher degree of fusion in the prior art specimens than in the present invention specimens.

While the embodiment of this invention has been described in detail by reference to the drawings, for illustrative purpose only, it is to be understood that the invention may be embodied with various changes and improvements, which may occur to those skilled in the art.

NOMENCLATURE OF REFERENCE SIGNS

10: Plastic deformation tapping tool with inside diameter finishing edges
16: External thread portion
20a-20f: Protruding parts
20al, 20cl, 20el: Large-diameter protruding parts
22: Relief parts 24: Chamfered end section
26: Complete thread section
40: Inside diameter finishing edges 42: Flutes
44: Relief surfaces 52: Inner circumferential surface
54: Internal thread O: Axis θ: Predetermined angle
A: Rotating direction of tapping tool

The invention claimed is:

1. A plastic deformation tapping tool comprising:
inside diameter finishing edges;
an external thread portion provided with a complete thread section; and
a chamfered end section that is formed contiguously to said complete thread section having:
  a diameter of that decreases in an axial direction of the chamfered end section toward an end face of the chamfered end section, and
  protruding parts and relief parts that are alternately formed in at least a length portion of the tapping tool from said chamfered end section to a first turn of thread of said complete thread section, so that said protruding parts are forced into an inner circumferential surface of a hole to be tapped, to form an internal thread in the inner circumferential surface by plastic deformation,
wherein:
at least one flute is formed so as to divide a crest of said external thread portion axially, in parallel with an axis O through said chamfered end section and said complete thread section, and only said complete thread section is formed with the inside diameter finishing edges defined by an inner wall surface of said flute functioning as a rake surface, so that the inside diameter finishing edges remove by cutting an apex of the crest of said internal thread, which crest is formed by said plastic deformation,
said protruding parts in said complete thread section are provided with large-diameter protruding parts formed in parallel with the axis O to form the inside diameter finishing edges, and each of said at least one flute is formed such that one of opposite open-end edges of the flute which is on an upstream side of the flute as seen in a rotating direction A of the tapping tool is coincident with an angular position of said large-diameter protruding parts about said axis O, and portions of said large-diameter protruding parts which are remote from said flute about said axis O are removed to form said diameter finishing edges,
said protruding parts in said chamfered end section constitute a plurality of linear arrays each of which consists of a plurality of protruding parts successively arranged in a direction parallel to said axis O and which are angularly spaced apart from each other about said axis O,
said large-diameter protruding parts are offset in the rotating direction A of the tapping tool about said axis O with respect to said protruding parts in said chamfered end section, and each of said at least one flute is formed so as to correspond to said large-diameter protruding parts, in said relief parts which are located between said plurality of linear arrays of protruding parts in said chamfered end section, about said axis O, and
said inside diameter finishing edges are formed along said one of the opposite open-end edges of each of said at least one flute, and are offset by a predetermined angle θ in said rotating direction A with respect to said protruding parts in said chamfered end section.

2. The plastic deformation tapping tool according to claim 1, wherein an angular position of each of said at least one flute about said axis O and a cross sectional shape of said each flute are determined so as to prevent said plurality of protruding parts in said chamfered end section from forming said internal thread.

3. The plastic deformation tapping tool according to claim 1, wherein the crest of said external thread portion is formed such that the crest of said external thread portion has a constant cross sectional shape in entire lengths of said chamfered end section and said complete thread section, and diameters of said protruding parts and said relief parts are adjusted to respective values,
said at least one flute is formed such that the open-end edge of each of the at least one flute which is on the upstream side of the flute as seen in said rotating direction A is coincident with the angular positions of said large-diameter protruding parts, and downstream side portions of said large-diameter protruding parts as seen in said rotating direction A are removed in the presence of said at least one flute, and
the portions of said large-diameter protruding parts remote from said each flute are removed down to a root of said crest, to form a relief surface along with said inside diameter finishing edges.

* * * * *